US009938402B2

(12) United States Patent
Byravan et al.

(10) Patent No.: US 9,938,402 B2
(45) Date of Patent: Apr. 10, 2018

(54) ADDITIVE COMPOSITION AND COMPOSITIONS AND ARTICLES CONTAINING THE SAME

(71) Applicant: 3M INNOVATIVE PROPERTIES COMPANY, St. Paul, MN (US)

(72) Inventors: Arun Byravan, Tamil Nadu (IN); Alagappan Chidambaram, Tamil Nadu (IN)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 14/648,199

(22) PCT Filed: Nov. 18, 2013

(86) PCT No.: PCT/US2013/070570
§ 371 (c)(1),
(2) Date: May 28, 2015

(87) PCT Pub. No.: WO2014/085126
PCT Pub. Date: Jun. 5, 2014

(65) Prior Publication Data
US 2015/0299444 A1  Oct. 22, 2015

(30) Foreign Application Priority Data

Nov. 30, 2012 (IN) .......................... 5012/CHE/2012

(51) Int. Cl.
C08L 7/00 (2006.01)
C08K 5/098 (2006.01)
C08L 9/06 (2006.01)
C08L 27/12 (2006.01)
C08L 27/16 (2006.01)
C08L 27/18 (2006.01)
C08L 27/20 (2006.01)
C08L 21/00 (2006.01)
C08L 71/00 (2006.01)
C08L 71/02 (2006.01)
C08L 77/02 (2006.01)
C08L 9/02 (2006.01)
C08L 23/16 (2006.01)
C08J 3/22 (2006.01)

(52) U.S. Cl.
CPC .............. C08L 23/16 (2013.01); C08J 3/226 (2013.01); C08L 9/02 (2013.01); C08J 2307/00 (2013.01); C08J 2309/00 (2013.01); C08J 2323/16 (2013.01); C08J 2427/20 (2013.01)

(58) Field of Classification Search
CPC ........... C08K 5/02; C08K 5/098; C08L 23/16; C08L 9/02; C08L 9/06; C08L 27/12; C08L 27/16; C08L 27/18; C08L 27/20; C08L 7/00; C08L 21/00
See application file for complete search history.

(56) References Cited

U.S. PATENT DOCUMENTS

| 2,968,649 | A |   | 1/1961  | Pailthorp |               |
|-----------|---|---|---------|-----------|---------------|
| 3,051,677 | A |   | 8/1962  | Rexford   |               |
| 3,318,854 | A |   | 5/1967  | Honn      |               |
| 3,651,243 | A | * | 3/1972  | Hornor    | ... H01B 11/20 |
|           |   |   |         |           | 174/103       |
| 4,141,874 | A |   | 2/1979  | Oka       |               |
| 4,534,799 | A | * | 8/1985  | Aguirre   | ... C08K 5/20  |
|           |   |   |         |           | 106/270       |
| 4,540,538 | A |   | 9/1985  | Corwin    |               |
| 4,829,116 | A |   | 5/1989  | Piesold   |               |
| 4,840,994 | A |   | 6/1989  | Moggi     |               |
| 4,855,360 | A |   | 8/1989  | Duchesne  |               |
| 4,895,897 | A | * | 1/1990  | Kaufman   | ... C08L 69/00 |
|           |   |   |         |           | 525/146       |
| 4,904,735 | A |   | 2/1990  | Chapman, Jr. |            |
| 5,010,130 | A |   | 4/1991  | Chapman, Jr. |            |
| 5,013,792 | A |   | 5/1991  | Chapman, Jr. |            |
| 5,015,693 | A |   | 5/1991  | Duchesne  |               |
| 5,061,759 | A |   | 10/1991 | Tommasi   |               |
| 5,064,594 | A |   | 11/1991 | Priester  |               |
| 5,089,200 | A |   | 2/1992  | Chapman, Jr. |            |
| 5,093,400 | A |   | 3/1992  | Arcella   |               |
| 5,106,911 | A |   | 4/1992  | Chapman, Jr. |            |
| 5,132,368 | A |   | 7/1992  | Chapman, Jr. |            |
| 5,155,282 | A |   | 10/1992 | Marchionni |             |
| 5,244,955 | A |   | 9/1993  | Toyoda    |               |
| 5,244,971 | A | * | 9/1993  | Jean-Marc | ... C08G 81/02 |
|           |   |   |         |           | 525/64        |
| 5,266,639 | A |   | 11/1993 | Chapman, Jr. |            |
| 5,397,829 | A |   | 3/1995  | Morgan    |               |
| 5,464,904 | A |   | 11/1995 | Chapman, Jr. |            |
| 5,527,858 | A |   | 6/1996  | Blong     |               |
| 5,550,193 | A |   | 8/1996  | Chiu      |               |

(Continued)

FOREIGN PATENT DOCUMENTS

| CN | 101891914 | 11/2010  |
|----|-----------|----------|
| DE | 4421420   | 12/1995  |

(Continued)

OTHER PUBLICATIONS

Ciesielski (An Introduction to Rubber Technology: 3.2 The Basic Compound Formula. 3.3.3 Zinc Oxide and Stearic Acid. 1999, pp. 31-48).*
Neumann, "Fluoropolymer Processing Additives with Improved Color Stability", IP.com Journal, Oct. 14, 2008, 7 Pages.
Kanu, "Rheology of Polymer Blends: Simultaneous Slippage and Entrance Pressure Loss in the Ethylene-Propylene-Diene (EPDM)/ Viton System", Polymer Engineering and Science, Mid-Jun. 1982, vol. 22, No. 8, pp. 507-511.
Morris, "Metallic Stearates: A Review of Their Function and Use As Release Agents for Rubber Compounds", HallStar Technical Publication, 11 pages.
B.V. Johnson, T.J. Blong, J.M. Kunde, D. Duchesne; *Factors Affecting the Interactions of Polyolefin Additives with Fluorocaron Elastomer Processing Aids*, TAPPI PLC Conference, Sep. 13, 1988, 11 pages.

(Continued)

Primary Examiner — Brieann R Johnston

(57) ABSTRACT

An additive composition that includes fluoropolymer, synergist, and fatty acid metal salt.

19 Claims, No Drawings

(56) References Cited

U.S. PATENT DOCUMENTS

| | | |
|---|---|---|
| 5,587,429 A | 12/1996 | Priester |
| 5,707,569 A | 1/1998 | Priester et al. |
| 5,710,217 A | 1/1998 | Blong |
| 5,719,209 A | 2/1998 | Miller |
| 6,242,548 B1 | 6/2001 | Duchesne et al. |
| 6,277,919 B1 | 8/2001 | Dillon |
| 6,294,604 B1 | 9/2001 | Focquet |
| 6,306,971 B1* | 10/2001 | Betremieux ............ C08L 9/02 525/104 |
| 6,380,313 B1 | 4/2002 | Dillon |
| 6,599,982 B2 | 7/2003 | Oriani |
| 6,734,252 B1 | 5/2004 | Woods |
| 6,780,481 B1 | 8/2004 | Lavallée |
| 6,818,695 B2 | 11/2004 | Dillon |
| 6,894,118 B2 | 5/2005 | Chapman, Jr. |
| 7,001,951 B2 | 2/2006 | Chapman, Jr. |
| 7,420,010 B2 | 9/2008 | Sukhadia |
| 7,488,838 B2 | 2/2009 | Daute |
| 8,501,862 B2 | 8/2013 | Bonnet |
| 2004/0192818 A1* | 9/2004 | Oriani .................... B29C 47/94 524/284 |
| 2005/0070644 A1 | 3/2005 | Tikuisis |
| 2005/0101722 A1 | 5/2005 | Briers |
| 2005/0245687 A1 | 11/2005 | Appel |
| 2005/0281973 A1 | 12/2005 | Park |
| 2009/0197028 A1 | 8/2009 | Lyons |
| 2010/0311906 A1 | 12/2010 | Lavallée |
| 2011/0172338 A1 | 7/2011 | Murakami |

FOREIGN PATENT DOCUMENTS

| | | |
|---|---|---|
| WO | 2010-024602 | 3/2010 |
| WO | 2010-037071 | 4/2010 |
| WO | 2013-078534 | 6/2013 |

OTHER PUBLICATIONS

J. Horns, E. Adair; *The Effect Fluoropolymer Processing Additive and Stearate Additive Levels Have on Processing of HDPE Resins*, Dyneon Paper 98-0504-1084-8, (Oct. 2001), 11 pages.

T. Blong, K. Fronek, B. Johnson, D. Klein, J. Kunde; *Processing Additives and Acid Neutralizers—Formulation Options in Polyolefins*, SPE Polyolefins VII International Conference, Feb. 27, 1991, 15 pages.

Oleg Kulikov, Klaus Hornung, Manfred Wagner; *Low Viscous Hydrophilic Processing Additives for Extrusion of Polyethylene at Reduced Temperatures*; Polymer Engineering and Science (2010); 1237-1252.

International search report for PCT International Application No. PCT/US2013/070570, dated Jan. 28, 2014, 4 pages.

Communication and Supplementary European Search Report, European Patent Application 13858823.1, dated Jun. 1, 2016, 4 pages.

* cited by examiner

US 9,938,402 B2

ADDITIVE COMPOSITION AND COMPOSITIONS AND ARTICLES CONTAINING THE SAME

CROSS REFERENCE TO RELATED APPLICATIONS

This application is a national stage filing under 35 U.S.C. 371 of PCT/US2013/070570, filed Nov. 18, 2013, which claims priority to IN 5012/CHE/2012, filed Nov. 30, 2012, the disclosure of which is incorporated by reference in its entirety herein.

BACKGROUND

Processing aids can decrease the time and energy consumed during mixing rubbers, such as nitrile butadiene rubber (NBR), natural rubber (NR), and ethylene propylene diene monomer (EPDM), allowing for maximum use of the expensive mixing machinery. Typically utilized processing aids including paraffinic waxes, mineral oils, polar surfactants and petroleum resins for example function as external or internal lubricant due to limited compatibilities. Because of the limitations of known processing aids, there remains a need for new and useful processing aids for rubbers.

SUMMARY

The present disclosure provides an additive composition that includes fluoropolymer, synergist, and fatty acid metal salt.

Also disclosed are compositions that include disclosed additive compositions and rubber.

Also disclosed are articles formed from disclosed compositions.

The above summary is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Herein, "room temperature" or "RT" refers to a temperature of 20° C. to 30° C. or preferably 20° C. to 25° C.

The terms "comprises" and variations thereof do not have a limiting meaning where these terms appear in the description and claims. "Include," "including," or like terms means encompassing but not limited to, that is, including and not exclusive.

In this application, terms such as "a," "an," and "the" are not intended to refer to only a singular entity, but include the general class of which a specific example may be used for illustration. The terms "a," "an," and "the" are used interchangeably with the term "at least one." The phrases "at least one of" and "comprises at least one of" followed by a list refers to any one of the items in the list and any combination of two or more items in the list.

As used herein, the term "or" is generally employed in its usual sense including "and/or" unless the content clearly dictates otherwise. The term "and/or" means one or all of the listed elements or a combination of any two or more of the listed elements.

Also herein, all numbers are assumed to be modified by the term "about" and preferably by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used.

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The present disclosure generally provides compositions that can be utilized as processing aids for use in rubbers. Disclosed compositions can provide advantages in dispersing fillers, other additives, or both as well as act as a lubricant in order to ease processing. Disclosed compositions can generally include fluoropolymer, synergist and fatty acid metal salt. Disclosed compositions can include one or more than one fluoropolymer, one or more than one synergist, and one or more than one fatty acid metal salt.

Disclosed compositions include at least one fluoropolymer. The at least one fluoropolymer can provide lubricant action to reduce the coefficient of friction and form a low surface energy coating at the polymer-metal interface to produce slippage and reduce the sticking of the rubber in the equipment. Fluoropolymers that can be useful in disclosed compositions can include elastomeric fluoropolymers, that is fluoroelastomers or amorphous fluoropolymers, and thermoplastic fluoropolymers, that is semi-crystalline fluoropolymers. Useful fluoropolymers can include homopolymers and/or copolymers of fluorinated olefins. In some embodiments, the homopolymers or copolymers can have a fluorine atom-to-carbon atom ratio of at least 1:2, in some embodiments at least 1:1; and/or a fluorine atom-to-hydrogen atom ratio of at least 1:1.5. Alternatively, fluoropolymers that can be used in disclosed compositions can also be described as being in the fluid state at room temperature and above, i.e. fluoropolymers which have $T_g$ values below room temperature and which exhibit little or no crystallinity at room temperature.

Exemplary homopolymers that can be used are those derived, for example, from vinylidene fluoride and vinyl fluoride. Exemplar copolymers of fluorinated olefins that can be used are those derived, for example, from vinylidene fluoride, and one or more additional olefins, which may or may not be fluorinated (an example of a fluorinated olefin is hexafluoropropylene, and an example of a non-fluorinated olefin is propylene).

In some embodiments, exemplary fluoropolymers that can be utilized include copolymers of vinylidene fluoride with at least one terminally unsaturated fluoromonoolefin containing at least one fluorine atom on each double-bonded carbon atom, each carbon atom of said fluoromonoolefin being substituted only with fluorine, chlorine, bromine, hydrogen or lower fluoroalkyl groups (e.g. perfluoroalkyl having one to four carbon atoms) or fluoroalkoxy radicals (e.g. pertluoroalkoxy having one to four carbon atoms). Exemplary specific comonomers that can be used with vinylidene fluoride include perfluoropropylene, tetrafluoroethylene, chlorotrifluoroethylene, and pentafluoropropylene. In some embodiments, fluoropolymers polymerized from vinylidene fluoride, hexafluoropropylene, chlorotrifluoroethylene, tetrafluoroethylene, perfluoroalkyl perfluorovinyl ethers, or combinations thereof can be utilized. Specific examples of the fluoroelastomers which may be employed include copolymers of vinylidene fluoride and a comonomer selected from hexafluoropropylene, chlorotrifluoroethylene, 1-hydropentafluoropropylene, and 2-hydropentafluoropropylene; copolymers of vinylidene fluoride, tetrafluoroethylene, and hexafluoropropylene or 1- or 2-hydropentafluoropropylene; and copolymers of tetrafluoroethylene, propylene and, optionally, vinylidene fluoride, all of which are known in the art. In some embodiments, fluoropolymers obtained by copolymerizing perfluoropropylene and vinylidene fluoride can be utilized. Such specific fluoropolymers are described in U.S. Pat. No. 3,051,677 (Rexford) and U.S. Pat. No. 3,318,854 (Honn, et al.) for example. In some embodiments, fluoropolymers obtained by copolymerizing perfluoropropylene, vinylidene fluoride and tetrafluoroethylene can be utilized. Such specific fluoropolymers are described in U.S. Pat. No. 2,968,649 (Pailthorp et al.) for example. In some embodiments, fluoropolymers polymerized from or copolymers of hexafluoropropylene and vinylidene fluoride can be utilized. An exemplary copolymer of hexafluoropropylene and vinylidene fluoride is commercially available as Dynamar™ FX 9613 and FX 9614 (commercially available from 3M, Minnesota, USA).

Semi-crystalline fluoropolymers which may be used in disclosed compositions include, but are not limited to poly(vinylidene fluoride), homopolymers and copolymers of tetrafluoroethylene (such as Teflon® FEP fluorocarbon resin, and copolymers of tetrafluoroethylene, propylene and, optionally, vinylidene fluoride). Multimodal fluoropolymers, such as those disclosed in International Patent Publication WO 00/69967, may also be employed as the fluoropolymer in disclosed compositions. "Multimodal" as used herein means that the fluoropolymer has at least two components of discrete and different molecular weights. Both components may be amorphous or semi-crystalline, or one component may be amorphous and another component semi-crystalline.

Disclosed compositions also include at least one synergist. The synergist can both function as a dispersant for the components of the compositions and as an external lubricant for the rubber. Synergists are generally low viscosity polymers with a polar backbone, or polar compounds. Examples of such synergists include i) silicone-polyether copolymers; ii) aliphatic polyesters such as poly(butylene adipate), poly(lactic acid) and polycaprolactone polyesters; iii) aromatic polyesters such as phthalic acid diisobutyl ester; iv) polyether polyols such as poly(tetramethylene ether glycol); v) amine oxides such as octyldimethyl amine oxide; vi) carboxylic acids such as hydroxy-butanedioic acid; vii) fatty acid esters such as sorbitan monolaurate and triglycerides; and vii) poly(oxyalkylene) polymers.

In some embodiments, the synergist can be a poly(oxyalkylene) polymer. Exemplary poly(oxyalkylene) polymers can include poly(oxyalkylene) polyols and derivatives thereof. Specific exemplary poly(oxyalkylene) polymers can be represented by the formula I below:

$$A[(OR^1)_xOR^2]_y \qquad (1)$$

In formula I, A can be an active hydrogen-free residue of a low molecular weight, initiator organic compound having a plurality of active hydrogen atoms (e.g. 2 or 3), such as a polyhydroxyalkane or polyether polyol, e.g. ethylene glycol, glycerol, 1,1,1,-trimethylol propane, and poly(oxypropylene) glycol.

In formula 1, y can be 2 or 3.

In formula I, $(OR^1)_x$ can be a poly(oxyalkylene) chain having a plurality of oxyalkylene groups, $(OR^1)$, wherein the $R^1$ radicals can be the same or different, and are selected from the group consisting of $C_1$ to $C_5$ alkylene radicals; and x is the number of oxyalkylene units. In some embodiments, the $R^1$ radicals can be the same or different, and are selected from the group consisting of $C_2$ and $C_3$ alkylene radicals. Said poly(oxyalkylene) chain can be a homopolymer chain, e.g. poly(oxyethylene) or poly(oxypropylene), or can be a chain of randomly distributed (i.e., a heteric mixture) oxyalkylene groups, e.g. a copolymer of —$OC_2H_4$— and —$OC_3H_6$— units, or can be a chain having alternating blocks or backbone segments of repeating oxyalkylene groups e.g., a polymer comprising

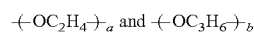

blocks, where a+b=x, is about 5 to about 500 and in some embodiments about 10 to 300. $R^2$ is H or an organic radical such as alkyl, aryl or combinations thereof such as aralkyl or alkaryl, and may contain hetero atoms such as O or N. For example, $R^2$ can be methyl, butyl, phenyl, benzyl, and acyl groups such as acetyl ($CH_3CO$—), benzoyl ($C_6H_5CO$—) and stearoyl ($C_{17}H_{35}CO$—).

Specific poly(oxyalkylene) polymer derivatives that can be utilized herein can include, for example, poly(oxyalkylene) polyol derivatives wherein the terminal hydroxy groups have been partly or fully converted to ether derivatives, e.g., methoxy groups, or ester derivatives, e.g. stearate groups, ($C_{17}H_{35}COO$—). Other useful poly(oxyalkylene) derivatives include polyesters, e.g. prepared from dicarboxylic acids and poly(oxyalkylene) glycols. In some embodiments, the major proportion of the poly(oxyalkylene) polymer derivative by weight will be the repeating oxyalkylene groups, (OR). Said poly(oxyalkylene) polyols and their derivatives can be liquids or solids at room temperature and can have a molecular weight of at least 200 and in some embodiments a molecular weight of about 400 to 20,000 or in some embodiments even higher, e.g. 200,000 or more.

Specific poly(oxyalkylene) polyols useful in disclosed compositions can include those sold under the trademark CARBOWAX, such as CARBOWAX™3350, $H(OC_2H_4)_n$OH, where n is about 76 and CARBOWAX™8000 (Dow Chemicals, Midland Mich. USA) and those sold under the trademark PLURONIC e.g. PLURONIC™ F-77, $H(OC_2H_4)_d[OCH(CH_3)CH_2]_e(OC_2H_4)_f)H$, where d+f is about 108, and e is about 35.

In some embodiments, the poly(oxyalkylene) polymers can be poly(oxyethylene glycols, often referred to as polyethylene glycols (or "PEG"). In some embodiments, PEG having a molecular weight of about 1000 to 20,000 can be utilized.

In some embodiments, the synergist can be an aliphatic polyester. An exemplary aliphatic polyester that can be utilized in disclosed compositions can include polycaprolactone. In some embodiments, polycaprolactones having a number average molecular weight in a range from 1000 to 32000 can be utilized. In some embodiments, a polycaprolactone having a number average molecular weight in a range from 2000 to 10000 can be utilized. In some embodiments, a polycaprolactone having a number average molecular weight in a range from 2000 to 4000 can be utilized. A specific example of a polycaprolactone that can be utilized as a synergist in disclosed compositions has a molecular weight of about 4000 and is available under the trade designation CAPA 2402 (Perstorp UK Ltd, Warrington, Cheshire, WA4 6HA, UK).

Disclosed compositions also include at least one fatty acid metal salt. A fatty acid metal salt can function to provide torque reduction as well as thermally stabilizing the composition while it is being mixed in a processing machine (e.g., a mixer, or milling machine).

The fatty acid metal salt generally includes a fatty acid component and a metal cation component. In some embodiments, the fatty acid component and the metal cation can be ionically bonded together to form a compound before it is introduced into the composition.

A fatty acid can generally be described as a carboxylic acid with an aliphatic tail. The aliphatic tail can be either saturated or unsaturated. In some embodiments, the fatty acid can have a carbon number from about eight ($C_8$) to about thirty ($C_{30}$). In some embodiments, the fatty acid can have a carbon number from about eight ($C_8$) to about twenty six ($C_{26}$). The common names of the fatty acids having carbon numbers from eight to twenty six are: caprylic acid ($C_8$), capric acid ($C_{10}$), lauric acid ($C_{12}$), myristic acid ($C_{14}$), palmitic acid ($C_{16}$), stearic acid ($C_{18}$), arachidic acid ($C_{20}$), behenic acid ($C_{22}$), lignoceric acid ($C_{24}$), and cerotic acid ($C_{26}$). A fatty acid component in a fatty acid metal salt is generally without the hydrogen of the carboxylic acid and can generally be referred to by removing the . . . "ic acid" from the end of the name and replacing it with an "ate". For example therefore, exemplary fatty acid components of fatty acid metal salts can include caprylate, caprate, laurate, myristate, palmitate, stearate, arachidate, behenate, lignocerate, and cerotate.

A fatty acid metal salt also includes a metal cation. The metal cation ionically bonds to the fatty acid component, taking the place of the hydrogen ion of the carboxylic acid. Exemplary metal cations can include aluminum (Al), calcium (Ca), magnesium (Mg), and zinc (Zn).

Fatty acid metal salts that can be utilized in disclosed compositions can be referred to by a combination of the metal cation and the fatty acid, for example, zinc stearate. For example, zinc stearate is commercially available under the trade designation FINALUX SS (Fine Organics, Mumbai, India). Fatty acid metal salts useful in disclosed compositions can be formed and then added to a disclosed composition or can alternatively be formed in the composition. In embodiments where the fatty acid metal salt is formed in the composition, a first component containing the metal cation and a second component containing the fatty acid can both be added to the composition. An example of such an embodiment includes adding zinc oxide and stearic acid to the composition to form the fatty acid metal salt zinc stearate.

Disclosed compositions can be formulated and utilized in various types of formulations. A first type of composition can be referred to herein as an additive composition or a ternary additive composition. A disclosed additive composition can include at least one fluoropolymer, at least one synergist and at least one fatty acid metal salt. Additive compositions can be utilized as an additive for addition to rubber and/or other components in order to aid in processing the rubber, for example. Disclosed additive compositions can include various amounts of the three components. The amounts of the various components can be described by the weight percent of the component with respect to the total weight of the three components. In some embodiments, an additive composition can include amounts of fluoropolymer:synergist:fatty acid metal salt of about 90 wt % to 10 wt %:90 wt % to 10 wt %:80 wt % to 5 wt %. In some embodiments, an additive composition can include amounts of fluoropolymer:synergist:fatty acid metal salt of about 70 wt % to 30 wt %:45 wt % to 15 wt %:45 wt % to 5 wt %. In some embodiments, an additive composition can include amounts of fluoropolymer:synergist:fatty acid metal salt of about 60 wt % to 40 wt %:35 wt % to 15 wt %:35 wt % to 15 wt %. In certain exemplary embodiments, disclosed additive compositions can include amounts of fluoropolymer:synergist:fatty acid metal salt of about 50 wt %:25 wt %:25 Wt %. In certain other exemplary embodiments, disclosed additive compositions can include amounts of fluoropolymer:synergist:fatty acid metal salt of about 25 wt %:25 wt %:50 wt %. In certain other exemplary embodiments, disclosed additive compositions can include amounts of fluoropolymer:synergist:fatty acid metal salt of about 15 wt %:15 wt %:70 wt %.

A second type of composition can be referred to as rubber containing compositions. Rubber containing compositions can include final compositions that are to be processed into articles with the addition of very little or no additional components; and master batch compositions, which additional components including additional rubber is to be added to before they are processed into articles.

Disclosed rubber containing compositions include rubber. Exemplary types of rubber that can be utilized herein can include, for example, natural rubber, ethylene propylene diene monomer (EPDM) rubber, nitrile butadiene rubber (NBR), butadiene/styrene rubber, butadiene/acrylonitrile rubber, silicone rubber, or combinations thereof. In some embodiments, rubber containing compositions can include EPDM. NBR, or natural rubber.

Master batch compositions may make utilizing disclosed compositions easier when compared with a "neat" composition (i.e., a composition containing basically just the three components). A master batch composition can be added to additional rubber (or vice versa, the additional rubber could be added to the master batch composition) to form a final composition that is to be processed into articles for example. A master batch can be described as a mixture, or more specifically for example a dispersion, of an additive composition (i.e., fluoropolymer, synergist and fatty acid metal salt) and rubber.

A rubber containing composition to be utilized as a master batch composition can be characterized by the amount of rubber in relation to the total amount, by weight of the rubber and the additive composition. In some embodiments, a master batch composition can include at least about 60 wt % of rubber for example. In some embodiments, a master batch composition can include from about 60 wt % to about 95 wt % of rubber for example. Master batch compositions can also be described by the amount of additive composition contained therein. In some embodiments, a master batch composition can include about 30 wt % or less of an additive composition. In some embodiments, a master batch composition can include from about 5 wt % to about 30 wt % of an additive composition.

Master batch compositions can be made by mixing appropriate amounts of additive composition and rubber in a mixer, such as a Banbury V mixer for example. The master batch can be mixed at a temperature above the melting point of one or more of the components in order to aid mixing of the components.

A rubber containing composition to be utilized as a final composition that is to be processed into an article(s) (referred to herein as "processable compositions") can generally include an amount of the additive composition, rubber, and optionally other ingredients. The specific kinds of rubber that can be included in processable compositions are the same as those discussed above. It should be noted that processable compositions can be formed by combining the desired amount of additive composition with rubber, by combining additional rubber with a master batch composition, or a combination thereof.

Processable compositions can generally be characterized by the amounts of the various components. In some embodiments, processable compositions can be characterized by the amount of the additive composition contained therein with respect to the entire weight of the processable composition (the entire weight would include the weight of the additive composition, the rubber, and any other optional components). For example, in some embodiments, a processable composition can include from about 0.1 wt % to about 3 wt % of additive composition. In some embodiments, a processable composition can include from about 0.5 wt % to about 2.5 wt % of additive composition. In some embodiments, a processable composition can include about 2 wt % of additive composition.

Processable compositions can also include fillers. Exemplary fillers can include for example carbon black, silica, calcium metal silicate, calcium carbonate, clay, and barium sulfate. Additive compositions disclosed herein can assist in incorporating fillers, even at relatively high levels. In some embodiments, processable compositions can include from about 30 wt % to about 60 wt %/o filler.

Processable compositions disclosed herein can offer numerous benefits and/or advantages. Disclosed processable compositions can benefit from reduced mixing times and therefore reduced energy consumption, because fillers can be more easily dispersed because of the presence of the additive composition. Filler dispersion can be quantitatively monitored by the average size of the aggregates making up the composition. In some embodiments, processable compositions can have an average aggregate size of less than about 10 microns. Aggregate size can be measured using known methods, including for example, reflected light microscopy or SEM.

One exemplary method of characterizing aggregate size is through the use of a reflected light microscope commercially available under the trade name "disperGRADER" from Alpha Technologies, Akron, Ohio. The results from this analysis can include a characterization of White area. "White area" is caused by undispersed agglomerates. As the agglomerates are harder than the polymer matrix, they return to the surface after the sample is cut resulting in bumps on the surface which appear as white area in the photograph. The lower the % white area, the more dispersed the composition is and the % of undispersed filler is very minimal. This instrument also provides an X and Y rating. The X rating is based on the agglomerate size distribution on a 1-10 scale. If the dispersion is better the agglomerate size will be low and the rating will be high. The Y value is dependent on the amount of agglomerates above 23 micron. If there are less aggregates above 23 micron the Y rating will be higher indicating a better dispersion. The average agglomerate size and SD of the agglomerate size can also be utilized when comparing specimens made using the same type of filler, for example the same grade of carbon black.

Disclosed processable compositions can also have better flow properties, thereby rendering processing easier. Once disclosed processable compositions are deposited in molds, mold release, especially in molds having complicated profiles, can be enhanced. Better mold release can also lead to less mold fouling thereby decreasing time and effort required for mold cleaning. Better mold release minimizes sticking of the parts and the mold takes less time to clean. Minimizing the cleaning time can minimize the extent to which the platen temperature drops. If the platen temperature drops, the mold may need to be heated again, leading to a waste of time and energy during article molding.

Articles made using disclosed processable compositions can also have superior properties. For example, articles formed from processable compositions can have enhanced mechanical properties such as tensile strength and elongation at break. Articles formed from processable compositions can also have improved gloss and a generally improved appearance.

EXAMPLES

The following specific, but non-limiting, examples will serve to illustrate the invention. In these examples, all amounts are expressed in parts by weight, or parts by weight per one hundred parts by weight of rubber (phr). Abbreviations include g for grams, min for minutes, hrs for hours, rpm for revolutions per minute.

Test Methods
Dispersion Testing

Dispersion testing was done using a commercial instrument under the trade name "disperGRADER" from Alpha Technologies, Akron, Ohio. This instrument is a reflected light microscope using reflected light designed to measure filler dispersion of rubber compounds. A vulcanized rubber sample is cut with a razor blade and placed in front of the aperture with the cut face facing the aperture. Light is reflected onto the sample at a 30-degree angle. Light is reflected away from the smooth parts of the surface while light hitting agglomerates is reflected into the camera. ISO 11345 method B is the specification used to define measurement of dispersion characteristics of rubber. This specification gives a good background for dispersion testing as well as defining the standard testing conditions. "disperGRADER" reference scales are based on ISO 11345 method B, which makes use of the fact that a compound in which the elastomer and filler are well dispersed will show a smooth unblemished texture in reflected light. The presence of improperly dispersed ingredients is shown by irregularities that take the form of "bumps" on the surface, indicating a poorer dispersion of compounding ingredients. The size and frequency of these irregularities is used to judge the degree to which the compound falls short of optimal dispersion. A set of ten image standards has been established for each of the different reference scales in the disperGRADER. To each of these reference images a numerical rating 1-10 (the "X" value) has been assigned.

The test results are expressed on two numerical scales ranging from 1-10. The X-value is the rating relative to the image reference scale for the actual rubber type. This is a measure of filler distribution. If the dispersion is better the agglomerate size will be low and rating will be high. The Y-value is based on size and number of agglomerates causing reflections from surface irregularities. Sizes below 23 microns are ignored in the 100× magnification. The value is related to the occurrence of large agglomerates. If there are less numbers of aggregates above 23 micron the Y rating will be high indicating better dispersion.

This scheme provides a means of evaluating dispersion in a rubber compound and assigns numerical designations for the degree of dispersion.

A "disperGRADER" with 100× magnification measures and quantifies reflections from surface irregularities in the size range of 3 to 57 micrometers. Through the higher magnification resolution is enhanced for higher quality rubbers where the main bulk of agglomerates lies in the range of 3 to 57 micrometers. The analyzed area is equal to 1/10 of the area that is analyzed with the 30× instrument. Since the test area is smaller, the number of scans can be increased to achieve a larger test area if the distribution of agglomerates over the test surface is very uneven. The different scales and methods that are currently available for the "disperGRADER" with 100× magnification uses the "CB(x,y) method". Applications with a very high and even degree of carbon black dispersion require the increased resolution of the 100× magnification. The CB(x,y) method is a general method for all types of carbon blacks. Apart from the magnification, this method has an identical test specification as the international standard ISO 11345 method B. This method also rates the presence of large agglomerates. The test procedure implies no special requirements for the test sample. A sample suitable for rheometer testing is suitable for the "disperGRADER". A small piece of rubber is sliced with a sample cutter to expose a fresh, flat surface.

Hunter Lab Colorimeter Testing

A Hunter Lab (Reston, Va.) portable reflected-color spectrophotometer (MINISCAN® EZ) was used to measure the reflectance of the flat, opaque samples according to ASTM D6290.

Configure the software to read: color scale of CIE L a*b*, D65 light source as illuminant, and observer at a 10 degree angle. Standardize the instrument, first using the black glass or light trap to set the bottom of the scale. Make sure the black glass is in solid contact with the port or the light trap completely covers the port. Complete the standardization using the calibrated white standard. Place the rubber sample (10×10 cm sheet of 2 mm thickness) with the side to be measured facing up on a table top or other flat surface. Place the instrument port on top of the sample, making sure that it is completely covered by the area to be measured and is flat against it. Take a single color reading of the sample. Rotate the sample 90° and read it at least once more. Average the multiple color readings for a single color measurement representing its color. Averaging multiple readings with rotation between readings minimizes measurement variation associated with directionality. Record the average color values of L, a*, b*.

Gloss

Gloss measurements as shown in Table 4 were done according to ASTM D523 using a gloss meter commercially available from Testing Machines, Inc, New Castle, Del., USA under the trade name "NOVOGLOSS LITE 60°". The gloss of the molded components, which indicates homogeneity, is better in the ternary blend than any of the comparative examples.

SEM Imaging

A JEOL (Tokyo, JP) "JSM-6510 LV" Scanning Electron Microscope (SEM) was used to characterize the compounded samples and results tabulated in Table 2. The sample was microtomed to a 5 mm by 5 mm square shape with thickness of 1-2 mm. The sample was then placed in the specimen holder and platinum was sputter coated over the specimen under a vacuum of less than 5 torr for a duration of 80 seconds in a "JEOL JFC-1600" auto fine coater. The sputter coated sample was placed inside the SEM machine on the specimen mounting chamber and the sample exposed to a high vacuum and HT beam of 10 kV. The resolution of the image was improved by scan 4 and back scattered electrons image is captured to get clarity SEM image with auto adjustment on contrast and brightness. The "JSM-6510 LV" has a resolution of 3.0 nm at 30 kV. SEM images were taken at 5 kV or 10 kV at 100× to 900× to look for particle size, degradation dark spots, agglomeration and leaching or blooming at the surface.

Mechanical Testing

Tensile strength and Elongation at Break were measured as per ASTM D 412-Type C.

Compounding, Mixing and Curing Procedure

A BRABENDER® (Mixer Type WN 350E) was used for all precurative compounding and mixing. This model allows measurement of the resistance of the sample material to the rotating blades using a dynamometer. Torque and stock temperature vs. time was recorded for each sample material. The measured data are displayed numerically as a table and/or graphically as a diagram during the measurement on the monitor and can be printed and stored. Results are indicated in Table 4.

For all trials, the mixer temperature was maintained at 135° C., a cam type rotor blade "N" was used, the rotor speed was maintained at 50 rpm and the batch weight was fixed at 250 grams. It was verified that the mixer reached the set temperature before the mixing began.

The rubber (EPDM or NBR) was loaded into the BRABENDER mixer and warmed for 1 minute.

A pre-blend and the additive of examples 1 to 3 and comparative examples A through Q was added in one shot within a minute. The preblend for the EPDM samples was 105 phr Carbon Black 1, 25 phr RPO, 5 phr ZnO and 0.9 phr stearic acid. The preblend for the NBR samples was 5 phr ZnO, 1 phr stearic acid, 35 phr Carbon Black 2, 35 phr Carbon Black 3 and 7 phr of dioctyl phthalate. Once the mixer was full the start button on the mixer was pushed, which recorded the torque, fusion time, specific energy and fusion temperature vs. time. The time of mixing for all batches was set at 6 minutes. On completion of 6 minutes the rotor automatically stopped. The rubber compound was completely cleaned from the mixer and rotor and 3M SCOTCH-BRITE scrub pad was used to remove any residual material from the surface of the rotor and mixing vessel. Finally, the mixer was allowed to cool to the set temperature before starting the next batch.

For the EPDM samples the prepared "green compounds" were then mixed with a curative package of 1.8 phr sulphur, 1 phr MBTS, 0.8 phr TMT and 1 phr ZNBC in a two roll mill for 5-10 minutes and finally rolled out into a sheet of 3-4 mm thickness. The curative package for NBR samples was 1 phr sulphur, 1.5 phr CBS, 1 phr TMT. The curative incorporated rubber compound was then cured in a compression molding machine (M/S Santosh Rubber Machineries, Mumbai, India, 50 T Compression Curing Press) at 20-25 kg/cm2 and at a temperature of 170° C. for 10-15 minutes. The cured sheet was then tested using an oscillating disc rheometer (M/S TechPro, USA, MDR 2000) at 177° C. for 6 minutes with results in Table 3 as well as for mechanical properties in Table 2.

Comparative Examples

These comparative examples used 0, 1 or 2 of the required 3 elements of the rubber process aid as shown in Table 1. Data is shown in Table 2.

Examples

These examples used all three required elements of the rubber process aid (amorphous fluoropolymer, FX-9614), synergist (PEG or PCL) and fatty acid metal salt (zinc stearate) compounded into the rubber (EPDM or NBR) as shown in Table 1. Data is shown in Table 2.

TABLE 1

| Materials | |
|---|---|
| EPDM | Rubber commercially available from Lanxess, Cologne, Germany |
| NBR | Rubber commercially available under the trade designation "JSR N232S", JSR Corporation, Japan |
| ZnO | Zinc oxide commercially available from Rubamin Industries, India. |
| Stearic acid | Stearic acid commercially available from Godrej, India |
| RPO | A rubber process oil available commercially under the trade designation "RUBBEROL 245" from Chemoleums, Indi. |
| Carbon Black 1 | Carbon black, available commercially under the trade designation "FEF-N550" (Fast Extrusion Furnace Black) from Birla Carbon, India |
| Carbon Black 2 | Carbon black available commercially under the trade designation "HAF-N330" from Birla Carbon, India |
| Carbon Black 3 | Carbon black available commercially under the trade designation "SRF- N774" from Birla Carbon, India |
| Dioctyl phthalate | Plasticizer commercially available from Triveni Interchem Private Limited, India |
| Sulphur | Sulphur commercially available from Akrochem Corporation, USA. |
| CBS | N-Cyclohexyl-2-benzothiazole sulfenamide commercially available under the trade designation "PILCURE CBS" from NOCIL, India |
| MBTS | Benzothiazyl disulfide commercially available from NOCIL, India |
| TMT | Tetramethyl thiuram disulfide commercially available from NOCIL, India |
| ZNBC | Zinc dibutyl dithio carbamate commercially available from NOCIL, India |
| PEG | Polyethylene glycol available commercially under the trade designation "CARBOWAX 8000" from Dow Chemicals, Midland, MI, USA |
| FX-9614 | A partially fluorinated fluoroelastomer (FKM) processing aid commercially available from 3M Company, Saint Paul, MN, USA |
| PCL | A polycaprolactone of molecular weight 4000. Available commercially under the trade designation "CAPA 2402" from Perstorp UK Ltd, Warrington, Cheshire, WA4 6HA, UK. |
| ZnSt | Zinc stearate available commercially under the trade designation "FINALUX SS" from Fine Organics Mumbai, India |

TABLE 2

Formulations based on parts per hundred rubbers (phr) for Green Compound Preparation

| *Ex | Rubber (100 phr EPDM or NBR) | PEG phr | PCL phr | ZnSt phr | FX-9614 phr |
|---|---|---|---|---|---|
| CEA | EPDM | 0 | 0 | 0 | 0 |
| CEB | EPDM | 0 | 0 | 0 | 2 |
| CEC | EPDM | 2 | 0 | 0 | 0 |
| CED | EPDM | 0 | 0 | 2 | 0 |
| CEE | EPDM | 1 | 0 | 0 | 1 |
| CEF | EPDM | 0 | 0 | 1 | 1 |
| CEG | EPDM | 1 | 0 | 1 | 0 |
| EX1 | EPDM | 0.5 | 0 | 0.5 | 1 |
| CEH | EPDM | 0 | 2 | 0 | 0 |
| CEI | EPDM | 0 | 1 | 0 | 1 |
| CEJ | EPDM | 0 | 1 | 1 | 0 |
| EX2 | EPDM | 0 | 0.5 | 0.5 | 1 |
| CEK | NBR | 0 | 0 | 0 | 0 |
| CEL | NBR | 0 | 0 | 0 | 2 |
| CEM | NBR | 2 | 0 | 0 | 0 |
| CEN | NBR | 0 | 0 | 2 | 0 |
| CEO | NBR | 1 | 0 | 0 | 1 |
| CEP | NBR | 0 | 0 | 1 | 1 |
| CEQ | NBR | 1 | 0 | 1 | 0 |
| EX3 | NBR | 0.5 | 0 | 0.5 | 1 |
| EX4 | EPDM | 0.15 | 0 | 0.7 | 0.15 |
| EX5 | EPDM | 0.25 | 0 | 0.5 | 0.25 |

*All comparatives and examples used 105 phr carbon black (FEF N550), 25 phr RPO, 5 phr ZnO, 0.9 phr stearic acid, 1.8 phr sulphur, 1 phr MBTS, 0.8 phr TMT and 1 phr ZNBC.

TABLE 3

Dispersion, Colorimeter, SEM and Mechanical Test Results

| Ex | Avg Agg. Size (μ) | X | Y | White Area | L | a | b | *SEM | Tensile Strength (MPa) | Elong. at Break (%) | Gloss 60° |
|---|---|---|---|---|---|---|---|---|---|---|---|
| CEA | 9.7 | 5.6 | 9.6 | 4.1 | 16.8 | 0.33 | 1.1 | LP, DDS | 13.6 | 246 | 13-16 |
| CEB | 9.7 | 5.8 | 9.6 | 3.9 | 13.7 | -.02 | -.11 | MP, DDS | 14.8 | 256 | 20-23 |
| CEC | 10.1 | 5.1 | 9.4 | 4.0 | 13.8 | 0.22 | 0.53 | SP, DDS, B | 14.0 | 254 | 16-21 |
| CED | 9.1 | 6.1 | 9.7 | 3.0 | 14.3 | 0.12 | 0.35 | SP, DDS, B | 14.2 | 240 | 2-5 |
| CEE | 9.7 | 5.6 | 9.6 | 3.3 | 12.9 | 0.09 | 0.35 | SP, DDS | 14.6 | 262 | 12-15 |
| CEF | 9.4 | 6.4 | 9.8 | 2.3 | 13.5 | 0.07 | 0.21 | SP, A, B | 14.4 | 252 | 13-16 |
| CEG | 9.6 | 5.9 | 9.6 | 3.0 | 15.0 | 0.25 | 0.93 | SP, B | 14.3 | 260 | 12-13 |
| EX1 | 8.5 | 6.9 | 9.9 | 2.0 | 12.2 | 0.03 | 0.17 | SP | 15.3 | 270 | 24-28 |
| CEH | 9.67 | 6.3 | 9.7 | 2.74 | 15.3 | 0.05 | 0.87 | LP | 14.5 | 255 | 15 |
| CEI | 9.8 | 6.3 | 9.7 | 2.81 | 17.2 | 0.11 | 1.65 | SP, MP | 14.8 | 260 | 18 |
| CEJ | 10.1 | 6.0 | 9.6 | 2.91 | 17.0 | 0.08 | 1.48 | LP | 14.2 | 245 | 9-10 |
| EX2 | 9.57 | 6.5 | 9.8 | 2.56 | 14.7 | 0.09 | 1.05 | SP | 15.1 | 265 | 22-24 |
| CEK | 11.2 | 5.5 | 9.5 | 3.24 | 12.5 | 0.06 | 0.7 | MP LP | 16 | 203 | 16 |
| CEL | 10.1 | 6.2 | 9.6 | 2.57 | 9.92 | -0.02 | 0.65 | SP MP | 16.5 | 203 | 32 |
| CEM | 10.4 | 5.5 | 9.5 | 3.07 | 9.83 | 0.01 | 0.2 | SP & LP | 15.3 | 204 | 30-32 |
| CEN | 10.7 | 5.8 | 9.6 | 3.24 | 10.74 | -0.15 | -0.8 | LP B | 15.9 | 220 | 24 |
| CEO | 10.3 | 5.5 | 9.5 | 3.58 | 8.58 | 0.03 | 0.14 | SP | 16.6 | 210 | 30-31 |
| CEP | 10.4 | 6.2 | 9.7 | 2.23 | 9.35 | -0.23 | 0.3 | LP B | 16.5 | 230 | 25-26 |
| CEQ | 10.7 | 5.4 | 9.4 | 3.5 | 10.25 | 0.12 | 0.5 | LP | 15.2 | 207 | 26-28 |
| EX3 | 9.95 | 6.3 | 9.8 | 1.96 | 8.3 | -0.22 | -0.22 | SP | 17.3 | 218 | 35-37 |

TABLE 3-continued

Dispersion, Colorimeter, SEM and Mechanical Test Results

| Ex | Avg Agg. Size (μ) | X | Y | White Area | L | a | b | *SEM | Tensile Strength (MPa) | Elong. at Break (%) | Gloss 60° |
|---|---|---|---|---|---|---|---|---|---|---|---|
| EX4 | 8.2 | 6.6 | 9.8 | 2.2 | 11.6 | 0.06 | −0.04 | SP MP | 14.5 | 265 | 26-28 |
| EX5 | 8.7 | 6.7 | 9.7 | 2.3 | 12.0 | −0.14 | −1.07 | SP MP | 14.8 | 260 | 24-26 |

*SEM description:
SP, MP, LP = small, medium or large particles
DDS = degradation dark spots
A = agglomeration
B = blooming or surface leaching
Large Particle = 30-40 micron,
Medium particle = 10-20 micron,
Small particle = 1-5 micron

TABLE 4

Cure Rheology

| Example | ML, lb-in (dNm) | MH, lb-in (dNm) | ts2, min | t'50, mm | t '90, mm |
|---|---|---|---|---|---|
| CEA | 1.96 (2.21) | 19.52 (22.05) | 0.80 | 1.12 | 2.26 |
| CEB | 2.07 (2.34) | 20.27 (22.90) | 0.86 | 1.27 | 2.34 |
| CEC | 1.89 (2.14) | 20.2 (22.82) | 0.85 | 1.28 | 2.32 |
| CED | 1.82 (2.06) | 19.77 (22.34) | 0.86 | 1.21 | 2.38 |
| CEE | 1.84 (2.08) | 19.28 (21.78) | 0.85 | 1.13 | 2.27 |
| CEF | 1.83 (2.07) | 20.1 (22.71) | 0.85 | 1.05 | 2.28 |
| CEG | 1.89 (2.14) | 20.77 (23.47) | 0.87 | 1.10 | 2.18 |
| EX1 | 1.75 (1.98) | 20.19 (22.81) | 0.82 | 1.08 | 2.36 |
| CEK | 1.26 (1.42) | 28.88 (32.63) | 0.49 | 0.59 | 0.88 |
| CEL | 1.28 (1.45) | 30.53 (34.49) | 0.49 | 0.58 | 0.87 |
| CEM | 1.24 (1.40) | 27.36 (30.91) | 0.48 | 0.58 | 0.88 |
| CEN | 1.19 (1.34) | 25.00 (28.25) | 0.56 | 0.67 | 1.03 |
| CEO | 1.21 (1.37) | 26.35 (29.77) | 0.49 | 0.53 | 0.91 |
| CEP | 1.24 (1.40) | 28.79 (32.53) | 0.51 | 0.61 | 1.01 |
| CEQ | 1.23 (1.39) | 28.17 (31.83) | 0.51 | 0.61 | 0.99 |
| EX3 | 1.13 (1.28) | 28.09 (31.74) | 0.52 | 0.62 | 1.16 |

ML: minimum torque level in unit of dNm
MH: maximum torque level in unit of dNm
delta torque: difference between maximum torque (MH) and minimum torque (ML)
ts2: minutes to 2 dNm rise
t'50: minutes to 50% of delta torque (50% cure time)
t'90: minutes to 90% of delta torque (90% cure time)

Exemplary embodiments include the following:

Embodiment 1

An additive composition comprising:
fluoropolymer:
synergist; and
fatty acid metal salt.

Embodiment 2

The additive composition according to embodiment 1, wherein the amounts by weight % of the fluoropolymer, the synergist, and the fatty acid metal salt can range from 90-10%:90-10%:80-5%.

Embodiment 3

The additive composition according to embodiment 1, wherein the amounts by weight of the fluoropolymer, the synergist, and the fatty acid metal salt can range from 60-40%:35-15%:35-15%.

Embodiment 4

The additive composition according to embodiment 1, wherein the amounts by weight of the fluoropolymer, the synergist, and the fatty acid metal salt is about 50%:25%:25%.

Embodiment 5

The additive composition according to embodiment 1, wherein the amounts by weight of the fluoropolymer, the synergist, and the fatty acid metal salt is about 25%:25%:50%.

Embodiment 6

The additive composition according to embodiment 1, wherein the amounts by weight of the fluoropolymer, the synergist, and the fatty acid metal salt is about 15%:15%:70%.

Embodiment 7

The additive composition according to any one of embodiments 1 to 6, wherein the fluoropolymer was polymerized from vinylidene fluoride, hexafluoropropylene, chlorotrifluoroethylene, tetrafluoroethylene, perfluoroalkyl perfluorovinyl ethers, or combinations thereof.

Embodiment 8

The additive composition according to any one of embodiments 1 to 6, wherein the fluoropolymer is a copolymer of hexafluoropropylene and vinylidene fluoride.

Embodiment 9

The additive composition according to any one of embodiments 1 to 8, wherein the synergist comprises a poly(oxyalkylene) polymer, a polycaprolactone, or a combination thereof.

Embodiment 10

The additive composition according to any one of embodiments 1 to 9, wherein the fatty acid metal salt comprises zinc (Zn), calcium (Ca), magnesium (Mg), aluminum (Al) or a combination thereof.

Embodiment 11

The additive composition according to any one of embodiments 1 to 10, wherein the fatty acid metal salt comprises a mixture of C8 to C26 fatty acids.

Embodiment 12

A composition comprising:
the additive composition according to any one of embodiments 1-11; and
rubber.

Embodiment 13

The composition according to any one of embodiment 12, wherein the rubber comprises natural rubber, ethylene propylene diene monomer (EPDM) rubber, nitrile butadiene rubber (NBR), butadiene/styrene rubber, butadiene/acrylonitrile rubber, silicone rubber, or combinations thereof.

Embodiment 14

The composition according to embodiment 12 or 13, wherein the rubber comprises EPDM, NBR, or natural rubber.

Embodiment 15

The composition according to any one of embodiments 12 to 14 comprising at least about 70% by weight of rubber.

Embodiment 16

The composition according to any one of embodiments 12 to 14 comprising from about 60% to about 95% by weight of rubber.

Embodiment 17

The composition according to any one of embodiments 12 to 14 wherein the composition comprises from about 0.1 to about 3% by weight of additive composition.

Embodiment 18

The composition according to any one of embodiments 12 to 14, wherein the composition comprises from about 0.5% to about 2.5% by weight of additive composition.

Embodiment 19

The composition according to any one of embodiments 12 to 14, wherein the composition comprises about 2% by weight of additive composition.

Embodiment 20

The composition according to any one of embodiments 17 to 19, wherein the composition further comprises from about 30 wt % to about 60 wt % filler.

Embodiment 21

An article formed from the composition according to any one of embodiments 17 to 20.

Embodiment 22

The article according to embodiment 21, wherein the article has improved gloss.

What is claimed is:

1. A composition comprising:
   a rubber comprising natural rubber, nitrile butadiene rubber (NBR), butadiene/styrene rubber, butadiene/acrylonitrile rubber, silicone rubber, or a combination thereof;
   filler; and
   an additive composition comprising:
   a fluoropolymer;
   a synergist, wherein the synergist comprises a poly(oxyalkylene) polymer, a polycaprolactone, or a combination thereof; and
   a fatty acid metal salt,
   wherein the amounts by weight of the fluoropolymer, the synergist, and the fatty acid metal salt range from 90-10%:90-10%:80-5%, respectively, based on the total weight of the additive composition.

2. The composition of claim 1, wherein the composition comprises about 30 percent by weight of the filler.

3. The composition according to claim 1, wherein the amounts by weight of the fluoropolymer, the synergist, and the fatty acid metal salt range from 60-40%:35-15%:35-15%, respectively, based on the total weight of the additive composition.

4. The composition according to claim 1, wherein the amounts by weight of the fluoropolymer, the synergist, and the fatty acid metal salt are about 50%:25%:25%, respectively, based on the total weight of the additive composition.

5. The composition according to claim 1, wherein the amounts by weight of the fluoropolymer, the synergist, and the fatty acid metal salt are about 25%:25%:50%, respectively, based on the total weight of the additive composition.

6. The composition according to claim 1, wherein the amounts by weight of the fluoropolymer, the synergist, and the fatty acid metal salt are about 15%:15%:70%, respectively, based on the total weight of the additive composition.

7. The composition according to claim 1, wherein the fluoropolymer was polymerized from vinylidene fluoride, hexafluoropropylene, chlorotrifluoroethylene, tetrafluoroethylene, perfluoroalkyl perfluorovinyl ethers, or combinations thereof.

8. The composition according to claim 1, wherein the fluoropolymer is a copolymer of hexafluoropropylene and vinylidene fluoride.

9. The composition according to claim 1, wherein the fatty acid metal salt comprises zinc (Zn), calcium (Ca), magnesium (Mg), aluminum (Al) or a combination thereof.

10. The composition according to claim 1, wherein the fatty acid metal salt comprises a mixture of C8 to C26 fatty acids.

11. The composition according to claim 1, wherein the rubber comprises at least one of NBR or natural rubber.

12. The composition according to claim 1, wherein the composition comprises from about 0.1 to about 3% by weight of the additive composition.

13. The composition according to claim 1, wherein the composition comprises from about 0.5% to about 2.5% by weight of the additive composition.

14. The composition according to claim 1, wherein the composition comprises from about 30 wt % to about 60 wt % of the filler.

15. An article formed from the composition according to claim 12.

16. The composition according to claim 1, wherein the filler comprises carbon black.

17. The composition according to claim 16, wherein the rubber comprises at least one of NBR or natural rubber.

18. The composition according to claim 17, wherein the composition comprises from about 0.1 to about 3% by weight of the additive composition.

19. The composition according to claim 16, wherein the composition comprises from about 0.1 to about 3% by weight of the additive composition.

* * * * *

UNITED STATES PATENT AND TRADEMARK OFFICE
CERTIFICATE OF CORRECTION

PATENT NO. : 9,938,402 B2
APPLICATION NO. : 14/648199
DATED : April 10, 2018
INVENTOR(S) : Arun Byravan et al.

Page 1 of 1

It is certified that error appears in the above-identified patent and that said Letters Patent is hereby corrected as shown below:

In the Specification

Column 2
Line 57-58, delete "pertluoroalkoxy" and insert -- perfluoroalkoxy --, therefor.

Column 6
Line 25, delete "EPDM." and insert -- EPDM, --, therefor.
Line 53, delete "V" and insert -- ® --, therefor.

Column 7
Line 22, delete "%/o" and insert -- % --, therefor.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*